(12) United States Patent
Anderson et al.

(10) Patent No.: US 6,356,895 B1
(45) Date of Patent: Mar. 12, 2002

(54) METHOD AND COMPUTER PROGRAM PRODUCT FOR PROCESSING SYSTEM FILES USING A TRIGGER PROGRAM

(75) Inventors: Mark John Anderson, Oronoco; Robert Douglas Driesch, Jr., Rochester, both of MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/226,665

(22) Filed: Jan. 8, 1999

(51) Int. Cl.[7] .............................................. G06F 17/30
(52) U.S. Cl. ...................... 707/4; 707/2; 707/3; 707/6; 707/100; 707/103; 707/104
(58) Field of Search ........................... 707/2, 3, 4, 100, 707/103, 104

(56) References Cited

U.S. PATENT DOCUMENTS

| 5,642,505 A | * | 6/1997 | Fushimi | 707/104 |
| 5,742,810 A | * | 4/1998 | Ng et al. | 395/604 |
| 5,758,072 A | * | 5/1998 | Filepp et al. | 395/200.5 |
| 5,870,733 A | * | 2/1999 | Bass et al. | 707/2 |
| 6,006,224 A | * | 12/1999 | McComb et al. | 707/5 |
| 6,012,067 A | * | 1/2000 | Sarkar | 707/103 |
| 6,044,367 A | * | 3/2000 | Wolff | 707/2 |
| 6,134,546 A | * | 10/2000 | Bestgen et al. | 707/4 |
| 6,192,370 B1 | * | 3/2001 | Primsch | 707/103 |

* cited by examiner

*Primary Examiner*—Hosain T. Alam
*Assistant Examiner*—Cam-Y Truong
(74) *Attorney, Agent, or Firm*—Joan Pennington

(57) ABSTRACT

A method and computer program product are provided for processing system files. An associated trigger program is attached to each respective system file. The associated trigger program is utilized for pre-processing the respective system file to identify predetermined information. The identified predetermined information is stored in an internal structure. The internal structure is utilized to access the predetermined information when required to perform a query.

9 Claims, 5 Drawing Sheets

METHOD AND COMPUTER PROGRAM PRODUCT FOR PROCESSING SYSTEM FILES USING A TRIGGER PROGRAM

FIELD OF THE INVENTION

The present invention relates to the data processing field, and more particularly, relates to a method and computer program product for processing system files using a trigger program.

Description of the Related Art

Many Database Management Systems (DBMS) use system files to store information used to process queries. These files must then be probed to extract that information before it is used. Since I/O operations are generally very expensive and DBMS are performance critical, any additional I/O requests to extract this information can influence the overall system performance.

Performing any additional I/O operation while processing-a query request can be very expensive, this is why many of the DBMS try to pre-process as many queries as possible and store the implementation (query plans) for those queries so they do not have to be re-calculated them at run-time. This is normally done at program compilation or bind time and that information is stored as part of the program itself. This works fine for those queries that can be interpreted once and re-used many times (statistic SQL), but when dealing with dynamic SQL, where the query plans must be generated each time the query is executed, the SQL Catalog tables and initialization files must all be accessed in order to extract the information required to generated an appropriate plan.

Other implementations have been devised to allow more queries to be calculated one time and have that query plan bound to the program itself. The SQL Call Level Interface API's is one example of this implementation.

A need exists for a mechanism for processing system files to improve overall system performance in a computer system.

SUMMARY OF THE INVENTION

A principal object of the present invention is to provide a method and computer program product for processing system files. Other important objects of the present invention are to provide such method and apparatus for processing system files substantially without negative effects and that overcome many disadvantages of prior art arrangements.

In brief, a method and computer program product are provided for processing system files. An associated trigger program is attached to each respective system file. The associated trigger program is utilized for pre-processing the respective system file to identify predetermined information. The identified predetermined information is stored in an internal structure. The internal structure is utilized to access the predetermined information when required to perform a query.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
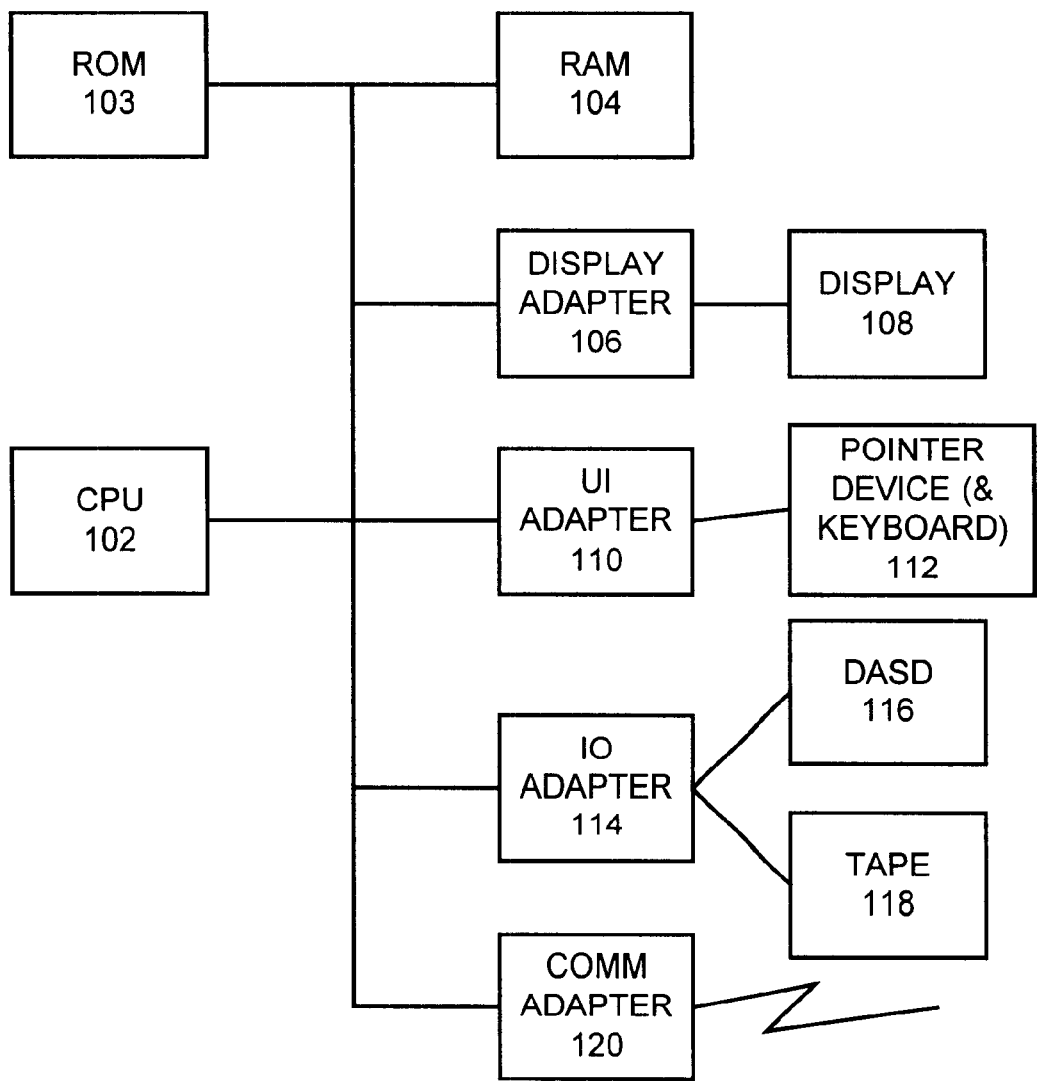
FIGS. 1 and 2 are block diagram representations illustrating a computer system and operating system for implementing a method and computer program product for processing system files using a trigger program in accordance with the preferred embodiment.
Figure 2:
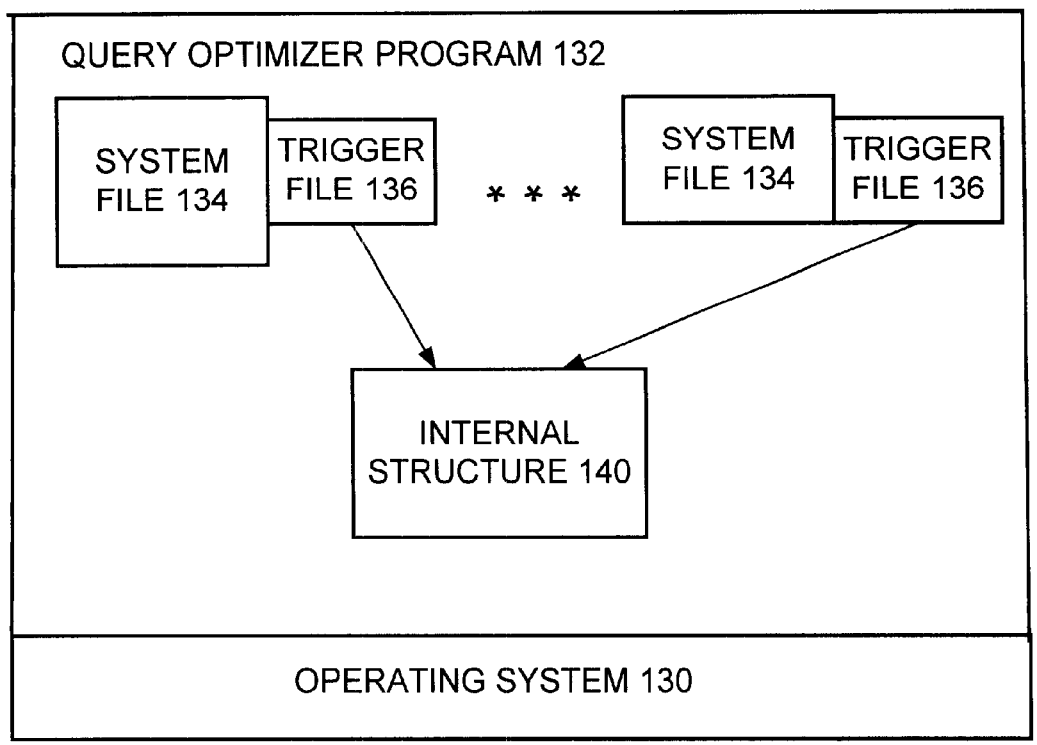

Having reference now to the drawings, in FIGS. 1 and 2, there is shown a computer or data processing system of the preferred embodiment generally designated by the reference character 100. As shown in FIG. 1, computer system 100 includes a central processor unit (CPU) 102, a read only memory 103, a random access memory 104, and a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1.

As shown in FIG. 2, computer system 100 includes an operating system 130 and a query optimizer program 132 of the preferred embodiment. Computer system 100 includes a plurality of system files 134 together with an attached trigger file 136 of the preferred embodiment. An internal structure 140 of the preferred embodiment stores pre-processing results from trigger file 136 including specific options that are interpreted and influence the query plans chosen by the query optimizer 132.

In accordance with features of the preferred embodiment, the trigger program 136 is enabled to pre-process its associated system file 134 that contains information required to perform any queries. The system files 134 contain information required by operating system 130 or query optimizer 132 to determine the implementation that should be chosen to perform a query. By allowing the trigger program 136 to pre-process the file 134 and store the results in the internal work structure 140, the need to perform this same operation for each query that is to be run on computer system 100 is avoided. This isolates all of the I/O operations to the point when the record was initially added or changed to the system file 134, taking the system file 134 out of the performance critical runtime code path. Examples of files 134 that can be used to take advantage of the system file processing of the preferred embodiment include any of the structured query language (SQL) Catalog or initialization (.INI) files used by most DBMS.

In accordance with features of the preferred embodiment, the associated trigger program 136 attached to each system files 134 is used to interpret any I/O operations against the respective system files 134. The trigger program 136 receives the record and then processes that record, storing the information into the internal structure 140. The internal structure 140 can be stored in a central location that can be accessed immediately by any process on computer system 100. This makes the process that caused the record to be inserted into the file to be the only process that has to pay for the costs of parsing, validating and storing into the internal structure 140 along with the I/O operation. All of the jobs on the machine can take advantage of this centrally located internal structure 140.

For example, the trigger program 136 is attached to the system .INI file 134. This trigger program is used to capture all of the I/O requests against the system .INI file 134. The trigger program 136 passes the record off to a system module that will parse the parameter and options and set the information into internal structure 140 accordingly. The internal structure 140 can be attached to the file header itself so that it actually becomes part of the system .INI file 134 that can be accessed by all of the jobs on the computer system 100. When a query is executed, the query optimizer 132 will extract the internal structure 140 from the .INI file 134 and use the information stored within there to influence the query plan it chooses. This way the query being executed does not have to pay any of the costs to open, read, parse and interpret the options stored within the .INI file. This forces the user that is changing the option in the .INI file to pay the additional expense of updating the structure 140 and sparing other jobs.

The trigger program 136 can serve an additional purpose of providing a security function that will prevent unauthorized users from setting options that might effect the behavior of the queries on system 100. Since the trigger program is the only interface that can interpret and set the internal structure 140, if a user is restricted from invoking the trigger program 136, then the I/O operation will fail. Also, if the user detaches the trigger program in order to perform the I/O operation, the underlying internal structure 140 would not be updated with this invalid record.

Figure 3:
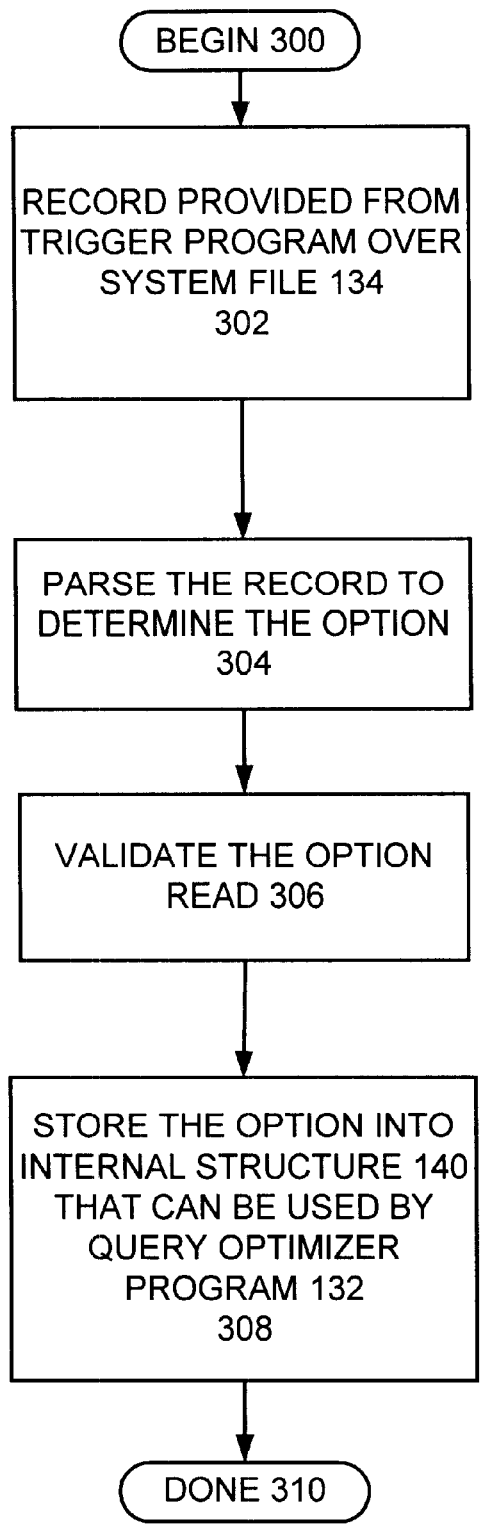
FIGS. 3 and 4 are flow charts illustrating exemplary steps for processing system files using a trigger program in accordance with the preferred embodiment.
Figure 4:
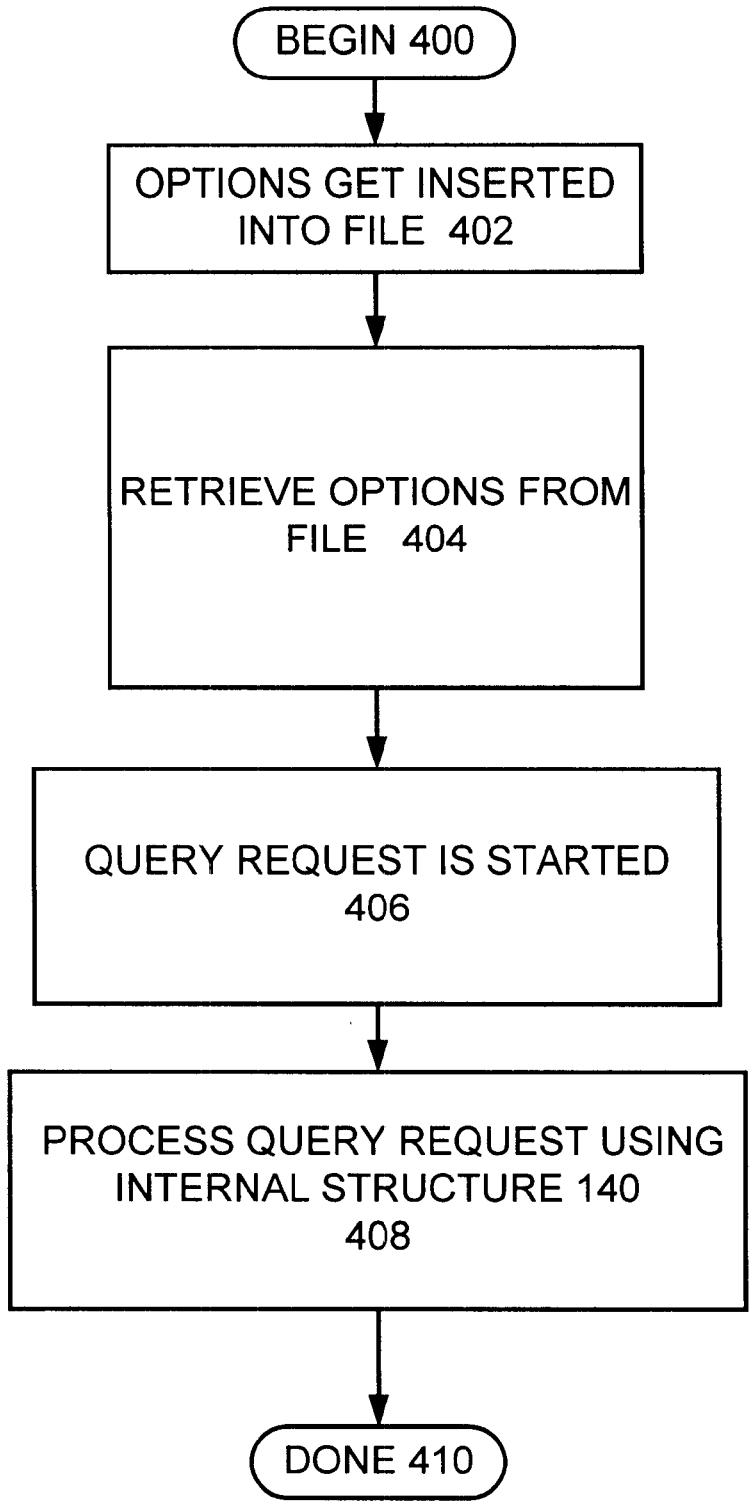

Referring now to FIGS. 3 and 4, there are shown exemplary steps for processing system files using trigger program 136 in accordance with the preferred embodiment. In FIG. 3, exemplary steps for processing each entry or record are shown starting at a block 300. A record is provided from trigger program 136 over system file 134 as indicated at a block 302. Trigger program 136 passes the record from the I/O operation to be parsed. The record is parsed to determine the option as indicated at a block 304. The option read is validated as indicated in a block 306. The option is stored into internal structure 140 that can be used by the query optimizer program 132 as indicated at a block 308. This completes the pre-processing operations as indicated at a block 310.

The method of the preferred embodiment as illustrated in FIG. 3, allows the system files 134 to be processed once and then allows those results to be used whenever a query plan needs to be generated.

In FIG. 4, exemplary steps for processing query requests are shown starting at a block 400. Options are inserted into a system file 134 as indicated at a block 402 which can be done at any time and is not limited to a particular query request. Next the options are retrieved from the file as indicated at a block 404. A query request is started as indicated at a block 406. Then the query request is processed using the internal structure as indicated at a block 408. This completes the query request processing operations as indicated at a block 410. By providing the options retrieval step at block 404 before the query processing steps at blocks 406 and 408, the overall performance of all query processing is increased as compared to prior art arrangements.

Figure 5:
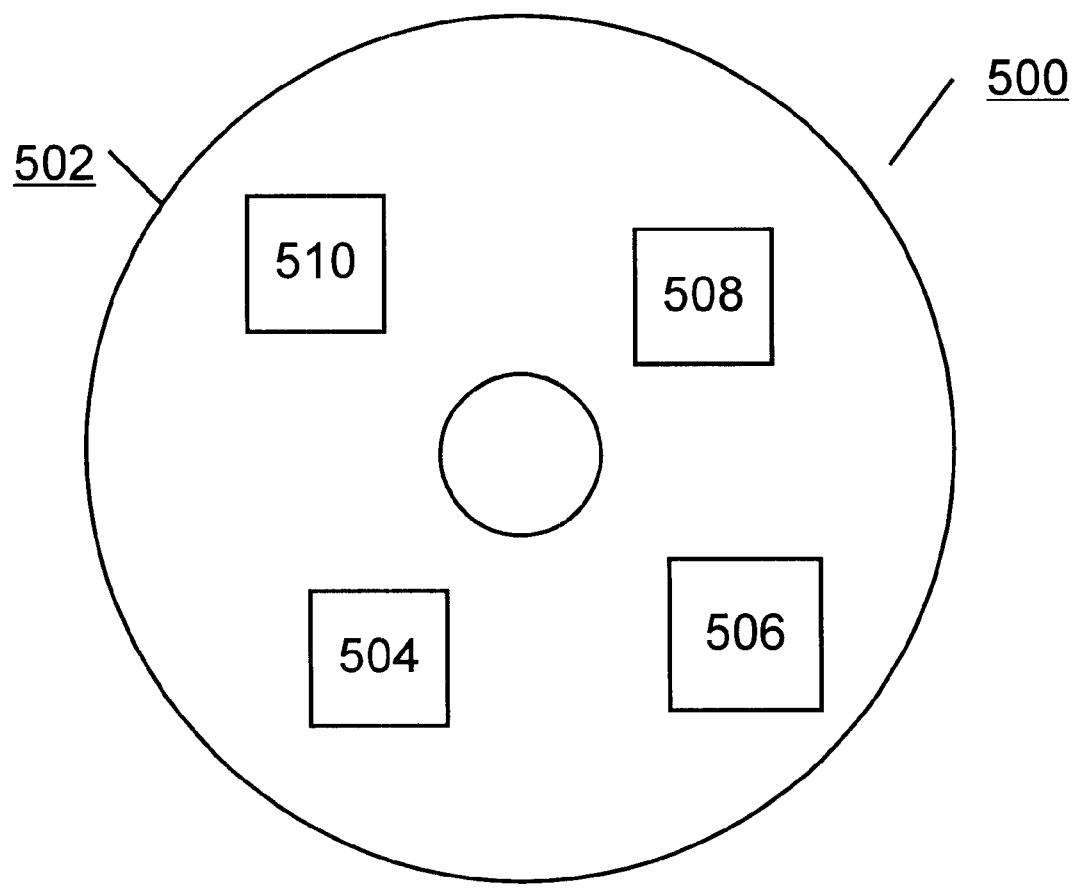
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods for processing system files of the preferred embodiment in the system 100 of FIGS. 1 and 2.

A sequence of program instructions or a logical assembly of one or more interrelated modules defined by the recorded program means 504, 506, 508, 510, direct the computer system 100 for processing system files using trigger program of the preferred embodiment.

While the present invention has been described with reference to the details of the embodiments of the invention shown in the drawing, these details are not intended to limit the scope of the invention as claimed in the appended claims.

What is claimed is:

1. A method for processing system files in a computer system; said system files storing information used for processing a query, said system files including structured query language (SQL) catalog files and system initialization files; said method comprising the steps of:

attaching an associated trigger program to each respective system file;

utilizing said associated trigger program for capturing all input/output (I/O) requests against said respective system file;

utilizing said associated trigger program for pre-processing said respective system file to identify predetermined information, utilizing said associated trigger program for storing said identified predetermined information in an internal structure; and utilizing said internal structure to access said predetermined information when required to perform a query.

2. The method for processing system files as recited in claim 1 wherein said step of utilizing said associated trigger program for pre-processing said respective system file to identify predetermined information, includes the steps of utilizing said associated trigger program with the system file for providing a record for parsing, and parsing the record to determine an option.

3. The method for processing system files as recited in claim 2 further includes the steps of validating the option read; and storing the option into said internal structure.

4. The method for processing system files as recited in claim 1 wherein said step of storing said identified predetermined information in said internal structure includes the step of storing said internal structure in a generally central location in the computer system, said internal structure being accessible by multiple processes in the computer system.

5. The method for processing system files as recited in claim 1 wherein said step of storing said identified predetermined information in said internal structure includes the step of attaching said internal structure in a file header of said respective system file.

6. A computer program product for processing system files in a computer system; said system files storing information used for processing a query, said system files including structured query language (SQL) catalog files and system initialization files; said computer program product comprising:

a recording medium;

means, recorded on the recording medium, for attaching an associated trigger program to each respective system file;

means, recorded on the recording medium, for utilizing said associated trigger program for capturing all input/output (I/O) requests against said respective system file;

means, recorded on the recording medium, for utilizing said associated trigger program for pre-processing said respective system file to identify predetermined information, means, recorded on the recording medium, for utilizing said associated trigger program for storing said identified predetermined information in an internal structure; and means, recorded on the recording medium, for utilizing said internal structure to access said predetermined information when required to perform a query.

7. The computer program product for processing system files as recited in claim 6 wherein said means, recorded on the recording medium, for utilizing said associated trigger program for pre-processing said respective system file to identify predetermined information, includes means, recorded on the recording medium, utilizing said associated trigger program with the system file, for providing a record; for parsing the record to determine an option; for validating the option read; and for storing the option into said internal structure.

8. The computer program product for processing system files as recited in claim 6 wherein said means, recorded on the recording medium, for storing said identified predetermined information in said internal structure includes means, recorded on the recording medium, for attaching said internal structure in a file header of said respective system file.

9. A computer system comprising:

a processor, a memory coupled to the processor for storing a computer program product for processing system files; said system files storing information used for processing a query, said system files including structured query language (SQL) catalog files and system initialization files; said computer program product including a plurality of computer executable instructions stored on a computer readable medium, wherein said instructions, when executed by said computer, cause the computer to perform the steps of:

attaching an associated trigger program to each respective system file;

utilizing said associated trigger program for capturing all input/output (I/O) requests against said respective system file;

utilizing said associated trigger program for pre-processing said respective system file to identify predetermined information, utilizing said associated trigger program for storing said identified predetermined information in an internal structure; and utilizing said internal structure to access said predetermined information when required to perform a query.

\* \* \* \* \*